(12) United States Patent
Gauba et al.

(10) Patent No.: US 8,868,119 B1
(45) Date of Patent: Oct. 21, 2014

(54) CARRIER FREQUENCY MODE SELECTION BASED ON DEVICE MOBILITY

(75) Inventors: Maneesh Gauba, Overland Park, KS (US); Anoop Kumar Goyal, Overland Park, KS (US); Sachin R. Vargantwar, Overland Park, KS (US); Jasinder Pal Singh, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 283 days.

(21) Appl. No.: 13/448,451

(22) Filed: Apr. 17, 2012

(51) Int. Cl.
*H04B 7/00* (2006.01)

(52) U.S. Cl.
USPC ..... 455/509; 455/435.1; 455/441; 455/553.1; 370/328

(58) Field of Classification Search
USPC ........ 455/422.1, 432.1, 433, 434, 435.1, 436, 455/440, 441, 500, 507, 509, 550.1, 552.1, 455/553.1; 370/328, 329, 341
See application file for complete search history.

(56) References Cited

U.S. PATENT DOCUMENTS

| | | | |
|---|---|---|---|
| 5,329,635 A | 7/1994 | Wadin et al. | |
| 5,436,956 A | 7/1995 | Shiotsuki et al. | |
| 5,450,473 A | 9/1995 | Shiotsuki et al. | |
| 5,548,808 A | 8/1996 | Bruckert et al. | |
| 6,487,409 B2 | 11/2002 | Qing-An | |
| 6,507,740 B2 | 1/2003 | Shi | |
| 6,714,789 B1 | 3/2004 | Oh et al. | |
| 6,745,034 B2 | 6/2004 | Wang et al. | |
| 6,907,243 B1 | 6/2005 | Patel | |
| 7,076,245 B1 | 7/2006 | Satapathy | |
| 7,082,304 B2 | 7/2006 | Wakabayashi | |
| 7,089,007 B2 | 8/2006 | Wakuta et al. | |
| 7,092,722 B1 | 8/2006 | Oh et al. | |
| 7,206,579 B2 | 4/2007 | Gwon et al. | |
| 7,302,266 B1 | 11/2007 | Sill et al. | |
| 7,693,518 B2 | 4/2010 | Miyata | |
| 7,738,874 B1 | 6/2010 | Sill et al. | |
| 2002/0102977 A1 | 8/2002 | Shi | |
| 2003/0119508 A1 | 6/2003 | Gwon et al. | |
| 2005/0221828 A1 | 10/2005 | Wakuta et al. | |
| 2006/0109820 A1 | 5/2006 | Miyata | |
| 2006/0126558 A1* | 6/2006 | Lee et al. | 370/329 |
| 2008/0070576 A1 | 3/2008 | Sanders et al. | |
| 2009/0225716 A1* | 9/2009 | Chen et al. | 370/329 |
| 2010/0056157 A1 | 3/2010 | Verona et al. | |

OTHER PUBLICATIONS

U.S. Appl. No 12/913,055, filed Oct. 27, 2010.

* cited by examiner

*Primary Examiner* — Nhan Le

(57) ABSTRACT

Embodiments disclosed herein provide systems and methods for selecting a carrier frequency mode based on wireless device mobility. In a particular embodiment, a method comprises, in a wireless access node, providing wireless communication access to a plurality of wireless communication devices over a plurality of carrier frequencies. The method further provides determining a mobility level of the plurality of wireless communication devices and selecting one of a first communication mode or a second communication mode for at least one of the plurality of carrier frequencies based on the mobility level, wherein the first communication mode allows full wireless access functionality and the second communication mode allows less than full wireless access functionality. The method further provides exchanging communications on the at least one of the plurality of carrier frequencies using the one of the first communication mode or the second communication mode that is selected.

17 Claims, 8 Drawing Sheets

| MOBILITY THRESHOLD TABLE 500 | | | | |
|---|---|---|---|---|
| Mobility Level | Carrier Freq. | Traffic | Previous State | Hand Down |
| < 45% | | | | |
| ≥ 45% and ≤ 55% | | | | |
| > 55% | | | | |

FIGURE 5

| VELOCITY THRESHOLD TABLE 700 | | | |
|---|---|---|---|
| Avg. Velocity (MPH) | Carrier 1 | Carrier 2 | Carrier 3 |
| < 30 | Traffic | Traffic | Traffic |
| ≥ 40 and ≤ 60 | Traffic | Traffic | Hand down |
| > 60 | Traffic | Hand down | Hand down |

FIGURE 7

CARRIER FREQUENCY MODE SELECTION BASED ON DEVICE MOBILITY

TECHNICAL BACKGROUND

A base station in a wireless communication network provides wireless communication access to wireless communication devices using one or more radio carrier frequencies in each wireless sector. These carrier frequencies may use more than one communication mode. These multiple communication modes may allow varying degrees of wireless communication functionality.

In one mode, the carrier frequencies are capable of full wireless communication functionality with wireless devices. This full functionality may include the ability to originate calls, terminate calls, and soft hand off seamlessly to other cells. In another mode, the carrier frequencies are capable of a lesser amount of wireless communication functionality. These lesser functionalities may not include some or all of the call origination/termination and soft handoff capabilities of the first mode and may use semi-soft hand off algorithms.

OVERVIEW

Embodiments disclosed herein provide systems and methods for selecting a carrier frequency mode based on wireless device mobility. In a particular embodiment, a method comprises, in a wireless access node, providing wireless communication access to a plurality of wireless communication devices over a plurality of carrier frequencies. The method further provides determining a mobility level of the plurality of wireless communication devices and selecting one of a first communication mode or a second communication mode for at least one of the plurality of carrier frequencies based on the mobility level, wherein the first communication mode allows full wireless access functionality and the second communication mode allows less than full wireless access functionality. The method further provides exchanging communications on the at least one of the plurality of carrier frequencies using the one of the first communication mode or the second communication mode that is selected.

BRIEF DESCRIPTION OF THE DRAWINGS

FIG. 5 illustrates a mobility threshold table for use when selecting a carrier frequency mode based on wireless device mobility.

FIG. 7 illustrates a velocity threshold table for use when selecting a carrier frequency mode based on wireless device mobility.

DETAILED DESCRIPTION

The following description and associated figures teach the best mode of the invention. For the purpose of teaching inventive principles, some conventional aspects of the best mode may be simplified or omitted. The following claims specify the scope of the invention. Note that some aspects of the best mode may not fall within the scope of the invention as specified by the claims. Thus, those skilled in the art will appreciate variations from the best mode that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
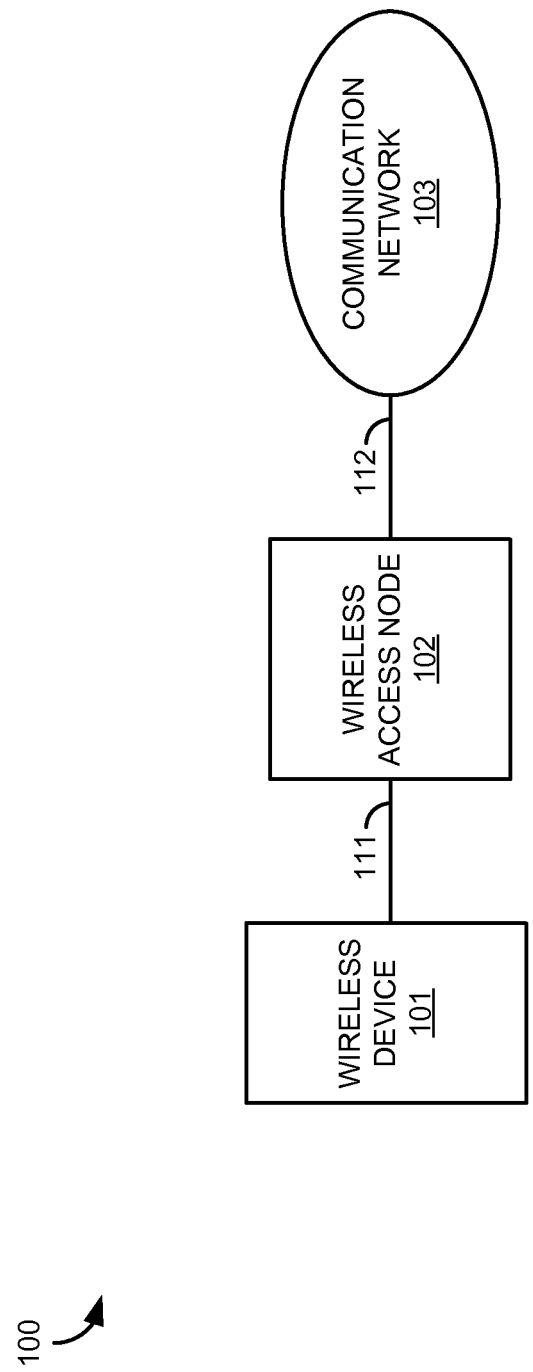
FIG. 1 illustrates a wireless communication system for selecting a carrier frequency mode based on wireless device mobility.

FIG. 1 illustrates wireless communication system 100. Wireless communication system 100 includes wireless communication device 101, wireless access node 102, and communication network 103. Wireless communication device 101 and wireless access node 102 communicate over wireless link 111. Wireless access node 102 and communication network 103 communicate over communication link 112.

In operation, access node 102 provides wireless communication devices, such as wireless device 101, with wireless access to communication network 103. The wireless access is provided over one or more carrier frequencies. Each of these carrier frequencies may be configured to provide wireless communication access using differing communication modes, with each communication mode allowing varying levels of wireless communication functionality.

For example, one mode for a carrier frequency may provide full wireless access functionality. Accordingly, wireless devices communicating on that carrier frequency are allowed to originate calls, terminate calls, perform soft handoffs to other sectors, and any other function associated with exchanging wireless communications. A second mode for a carrier frequency may provide a lesser amount of wireless access functionality. For example, this second mode carrier frequency may not allow call origination and may only allow wireless devices to perform semi soft handoffs to and from other wireless sectors. Traditionally, communication modes may be selected based on the communication load on each of the carrier frequencies.

Figure 2:
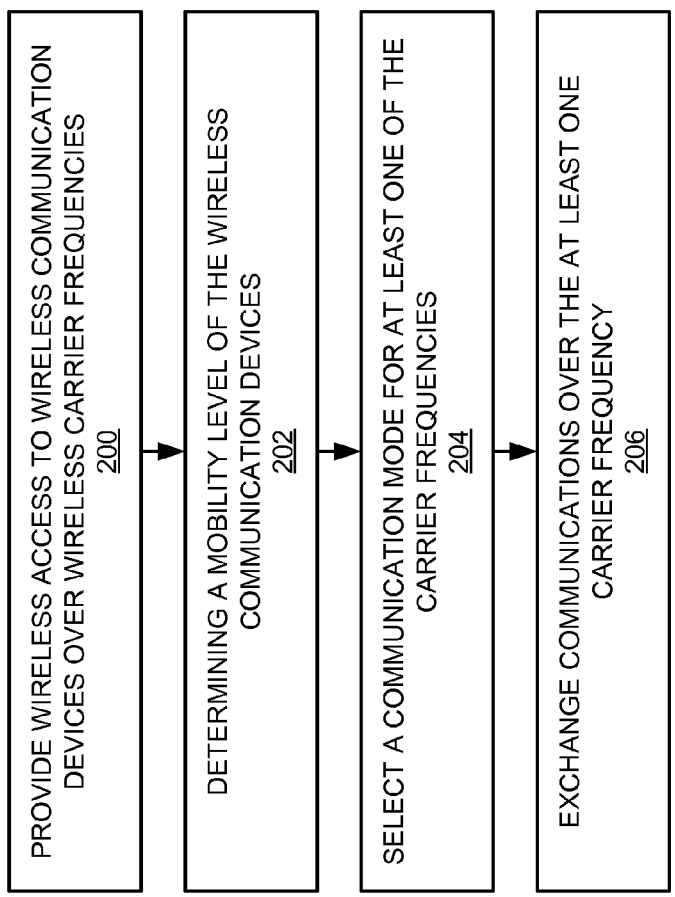
FIG. 2 illustrates the operation of the wireless communication system for selecting a carrier frequency mode based on wireless device mobility.

FIG. 2 illustrates the operation of wireless communication system 100 to select a carrier frequency mode based on wireless device mobility. In operation, wireless access node 102 provides wireless communication access to wireless communication devices including wireless device 101 over a plurality of carrier frequencies (step 200). Each carrier frequency may be operating under a preset communication mode or under a communication mode that was previously set using the process described herein.

A mobility level of the wireless communication devices is determined (step 202). The mobility level of the wireless devices provides a measure as to what portion of the wireless devices will be located within a wireless sector served by the carrier frequencies for an appreciable amount of time. A higher level of mobility corresponds to more wireless devices moving at higher rates of speed. It can therefore be inferred from a higher level of mobility that more wireless devices will be handing off to other wireless sectors than would otherwise be the case if the wireless devices were moving more slowly. In contrast, a lower level of mobility corresponds to more wireless devices moving at lower rates of speed, including stationary devices. It can be inferred from a lower level of mobility that more wireless devices are going to be located within the wireless sector served by the carrier frequencies for a relatively longer period of time.

In an example, the carrier frequencies serve a wireless sector that includes an office complex and has a highway passing through. During the morning and evening rush hours, the wireless sector may have a higher mobility level due to the number of wireless devices in cars passing through the sector on the highway. During the day between rush hours, the wireless sector may have a lower mobility level as most wireless devices belong to people in the office complex and are either slow moving or stationary.

The mobility level of the wireless devices may be a representation of the average velocity of the wireless devices in the sector, the median velocity of the wireless devices in the sector, a ratio of wireless devices that have left or entered the wireless sector within a period of time relative to the devices that remained in the wireless sector, a ratio of the number of wireless devices in the sector with a velocity above a threshold relative to the number of wireless devices below the threshold, or any other representation of the mobility level of a wireless sector.

A first communication mode or a second communication mode can then be selected for at least one of the carrier frequencies based on the mobility level, wherein the first communication mode allows full wireless access functionality and the second communication mode allows less than full wireless access functionality (step 204). The first communication mode is selected for lower mobility levels since a lower mobility level corresponds to more wireless devices staying in the wireless sector. Accordingly, wireless devices staying in the sector are more likely to use full wireless access functionality than a device that is just passing through the sector. It follows, therefore, that the second communication mode is selected for higher mobility levels because wireless devices that are more mobile will likely leave the sector before needing to use the full extent of wireless access functionality.

In some embodiments, when multiple carrier frequencies are serving a wireless sector, the first and second communication modes are selected for each of the carrier frequencies in proportion to the mobility level. For example, while the mobility level may indicate that most wireless devices in the sector are less mobile or immobile, there may still be a number of wireless devices that are mobile. Therefore, more carrier frequencies may be selected to use the first communication mode and a fewer number of carrier frequencies are selected to use the second communication mode to service the wireless devices that are more mobile.

After the communication mode is selected, communications are exchanged on the at least one of the plurality of carrier frequencies using the one of the first communication mode or the second communication mode that is selected (step 208). As time progresses the above operation may repeat so that the communication mode assigned to the one or more carrier frequencies remains consistent with the current mobility level of wireless devices in the wireless sector.

In some embodiments, an individual wireless device 101 may be assigned to exchange communications on a carrier frequency using a particular communication mode based on a velocity (current, average, median, or otherwise) of the wireless device. For example, if wireless device 101 is moving at a velocity above a threshold, then wireless device 101 will be assigned to a carrier frequency that has been selected to use the second communication mode.

Additionally, wireless device 101 may be assigned to a given carrier frequency further based on a distance of wireless device 101 from access node 102 and an amount of time that wireless device 101 is expected to be in the sector. For example, if wireless device 101 is moving quickly in a direction leading out of the wireless sector, then wireless device 101 will be assigned to a carrier frequency using the second communication mode. However, if wireless device 101 is moving around slowly in a location that is located well within the wireless sector, then wireless device 101 is expected to be in the sector for a longer duration than the previous example. Accordingly, wireless device 101 would be assigned to a carrier frequency that is using the first communication mode.

In some embodiments, wireless device 101 may be assigned to a carrier frequency based on a communication load for that carrier frequency. For example, if wireless device 101 has a velocity that causes wireless device 101 to be assigned to one of multiple carrier frequencies in the wireless sector using the second communication mode, then wireless device 101 may be assigned to the second communication mode carrier having the lowest communication load.

Referring back to FIG. 1, wireless communication device 101 comprises Radio Frequency (RF) communication circuitry and an antenna. The RF communication circuitry typically includes an amplifier, filter, modulator, and signal processing circuitry. Wireless communication device 101 may also include a user interface, memory device, software, processing circuitry, or some other communication components. Wireless communication device 101 may be a telephone, computer, e-book, mobile Internet appliance, wireless network interface card, media player, game console, or some other wireless communication apparatus—including combinations thereof.

Wireless access node 102 comprises RF communication circuitry and an antenna. The RF communication circuitry typically includes an amplifier, filter, RF modulator, and signal processing circuitry. Wireless access node 102 may also comprise a router, server, memory device, software, processing circuitry, cabling, power supply, network communication interface, structural support, or some other communication apparatus. Wireless access node 102 could be a base station, Internet access node, telephony service node, wireless data access point, or some other wireless communication system—including combinations thereof.

Communication network 103 comprises network elements that provide communications services to wireless device 101 through wireless access node 102. Communication network 103 may comprise switches, wireless access nodes, Internet routers, network gateways, application servers, computer systems, communication links, or some other type of communication equipment—including combinations thereof.

Wireless link 111 uses the air or space as the transport media. Wireless link 111 may use various protocols, such as Code Division Multiple Access (CDMA), Evolution Data Only (EVDO), Worldwide Interoperability for Microwave Access (WIMAX), Global System for Mobile Communication (GSM), Long Term Evolution (LTE), Wireless Fidelity (WIFI), High Speed Packet Access (HSPA), or some other wireless communication format. Communication link 112 uses metal, glass, air, space, or some other material as the transport media. Communication link 112 could use various communication protocols, such as Time Division Multiplex (TDM), Internet Protocol (IP), Ethernet, communication signaling, CDMA, EVDO, WIMAX, GSM, LTE, WIFI, HSPA, or some other communication format—including combinations thereof. Communication link 112 could be a direct link or may include intermediate networks, systems, or devices.

Figure 3:
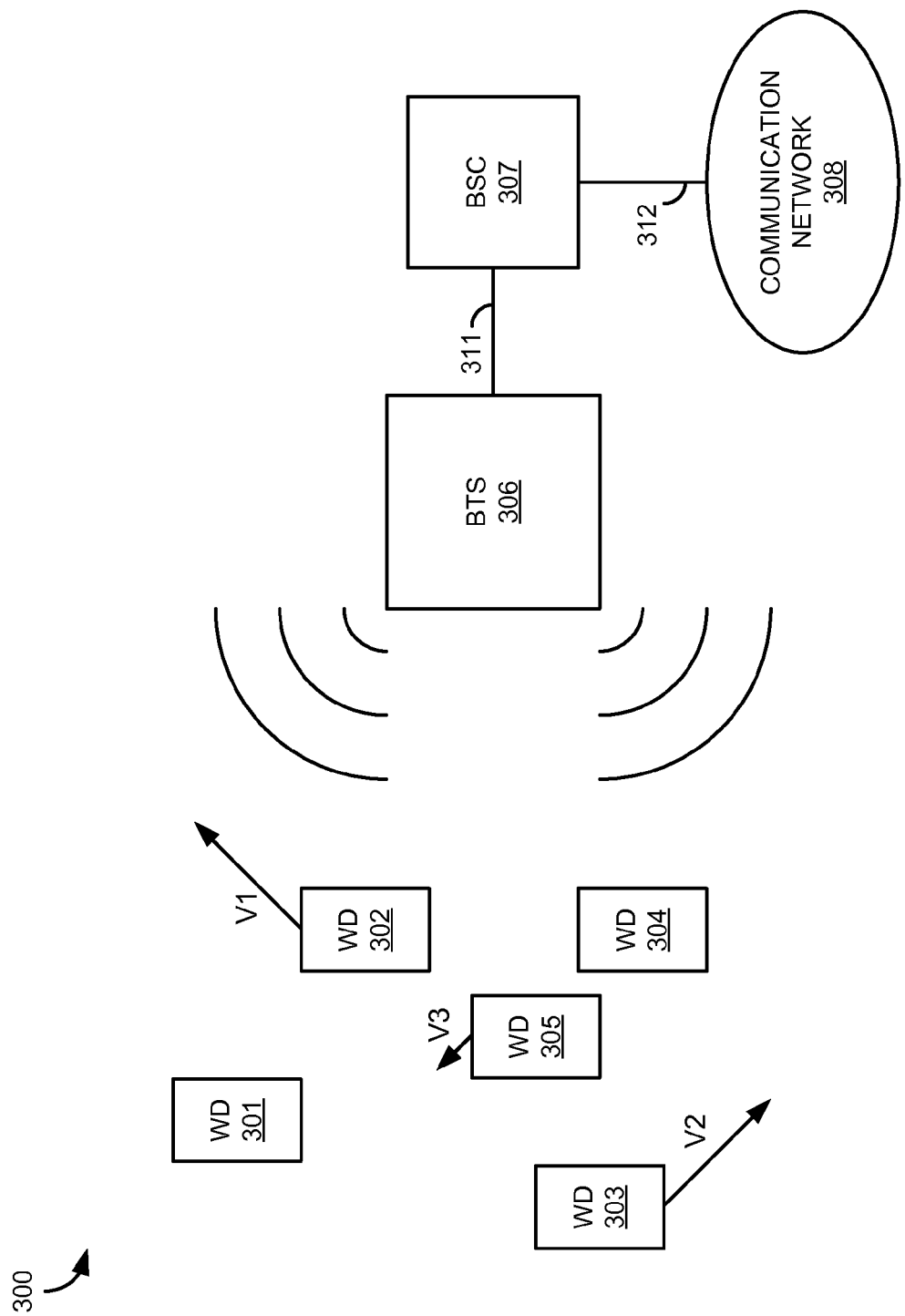
FIG. 3 illustrates a wireless communication system for selecting a carrier frequency mode based on wireless device mobility

FIG. 3 illustrates wireless communication system 300. Wireless communication system 300 includes wireless communication devices 301-305, base transceiver station (BTS) 306, base station controller (BSC) 307, and communication network 308. Wireless communication devices 301-305 communicate with BTS 306 over wireless links in a wireless sector. BTS 306 and BSC 307 communicate over communication link 311. BSC 307 and communication network 308 communicate over communication link 312.

Figure 4:
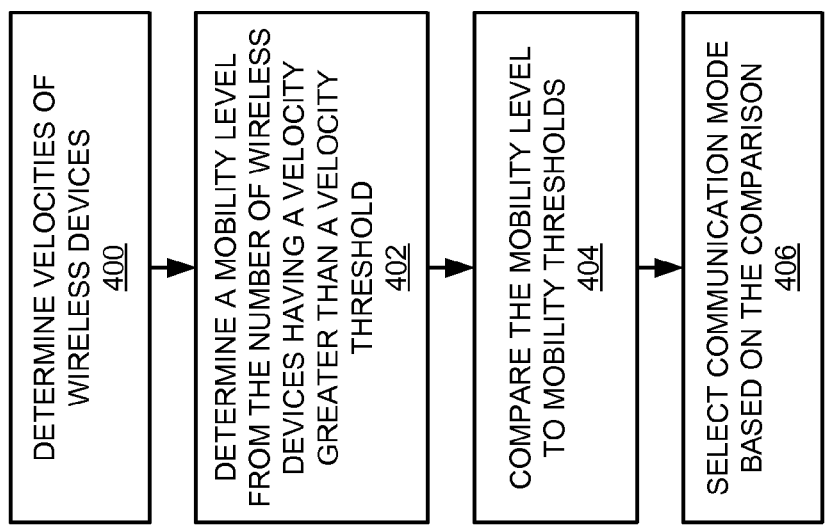
FIG. 4 illustrates the operation of the wireless communication system for selecting a carrier frequency mode based on wireless device mobility.

FIG. 4 illustrates the operation of wireless communication system 300 to select a carrier frequency mode based on wireless device mobility. In this example, BTS 306 provides wireless access in a wireless sector containing wireless devices 301-305 using two carrier frequencies. Two communication modes are possible for each of the carrier frequencies. One mode, commonly called a traffic mode, allows a carrier frequency to realize the full potential of wireless communication functionality while another mode, commonly called a hand down mode, does not allow call origination or termination and is merely used for communication traffic, including hand offs with other sectors. In the operation described below one carrier frequency may switch between traffic and hand down modes and the other is always in traffic mode to service wireless devices that may require full functionality.

To select a mode for the carrier frequency, BSC 307 determines velocities for each of wireless devices 301-305 (step 400). As illustrated in FIG. 3, wireless devices 301 and 304 are stationary while the V1, V2, and V3 arrows leading from wireless devices 302, 303, and 305 represent the relative magnitude and direction of the velocities of wireless devices 302, 303, and 305. The velocities of wireless devices 301-305 may be determined by receiving Global Positioning System or other sensor information from wireless devices 301-305, by performing BTS triangulation, or by any other method that can determine the velocity of a wireless device.

BSC 307 then determines a mobility level from the number of the velocities that have a magnitude greater than a velocity magnitude threshold (step 402). In this example, BSC 307 determines that the magnitudes of V1 and V2 are greater than a threshold value and the magnitude of V3 is lower than the threshold value. Therefore, since wireless devices 301 and 304 are stationary, two out of five or 40% of the wireless devices have velocity magnitudes above the threshold value. This 40% is the mobility level of the wireless devices in the wireless sector at the time the velocities were measured.

After the mobility level is determined, BSC 307 compares the mobility level to mobility thresholds (step 406). FIG. 5 illustrates mobility threshold table 500. Mobility threshold table 500 is a representation of a data structure that BSC 307 may use to compare mobility levels to mobility thresholds. Specifically, mobility threshold table 500 presents a column with mobility level thresholds and a carrier frequency communication mode that corresponds to the mobility level. It should be understood that the mobility level thresholds shown in table 500 are merely exemplary and can take any value that a network operator might choose.

In accordance with mobility threshold table 500, BSC 307 determines that the current 40% mobility level in the wireless sector corresponds to a carrier frequency for the sector being set to the traffic mode. BSC 307, therefore, selects the traffic mode for the carrier frequency (step 408). Alternatively, if the mobility level were above 55%, then the hand down mode would be selected for the carrier frequency. This process repeats itself periodically in order to keep the communication mode updated to more current conditions.

Furthermore, if the mobility level were between 45% and 55%, then the carrier frequency would maintain its previous mode. This buffer zone allows BSC 307 to avoid a ping-pong effect of changing carrier frequency modes if the mobility level changes only slightly across the mobility level threshold between two mobility level measurements.

In some embodiments, the method of FIG. 4 may be applied to multiple carrier frequencies in a wireless sector that can switch communication modes. In those embodiments, mobility threshold table 500 may further indicate which of the multiple carrier frequencies should use traffic mode and which should use hand down mode at given mobility level thresholds.

In some embodiments, wireless devices 301-305 may then be assigned to a carrier of the two carriers based on the magnitude of each device's velocity. For example, if V1 and V2 are above a velocity magnitude threshold, then each of those devices will be assigned to a carrier using the hand down mode unless the process above indicated that both carrier frequencies should be traffic mode. Likewise, wireless devices 301, 304, and 305 having velocity magnitudes below the threshold will be assigned to a traffic mode carrier. Additionally, BSC 306 may determine a carrier frequency mode based on the length of time that a wireless device is estimated to be in the sector. For example, while the magnitude of V2 may be above a threshold for wireless device 303 to be assigned a hand down mode carrier frequency, the direction of V2 may indicate that wireless device 303 will be in the sector for a period of time long enough to justify a traffic mode carrier frequency.

Figure 6:
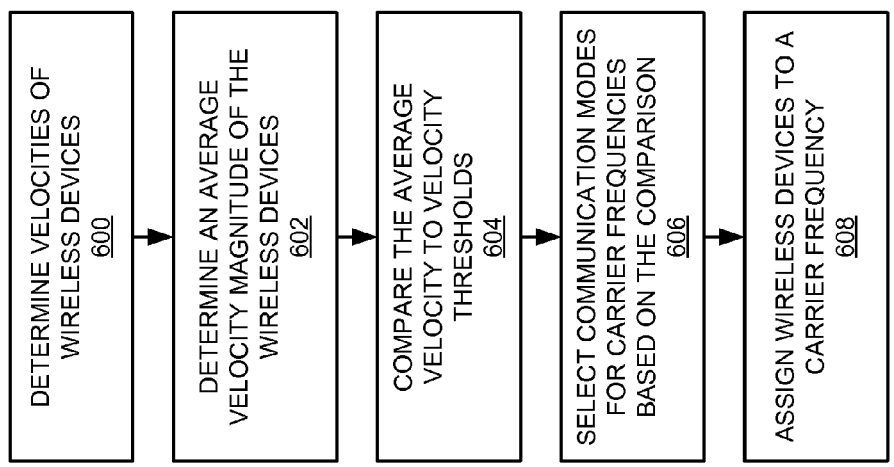
FIG. 6 illustrates the operation of the wireless communication system for selecting a carrier frequency mode based on wireless device mobility.

FIG. 6 illustrates an alternative operation of wireless communication system 300 to select a carrier frequency mode based on wireless device mobility. In this example, BTS 306 provides wireless access using three carrier frequencies, carriers 1-3. As in the example from above, the carrier frequencies may use traffic and hand down communication modes.

To determine a communication mode for carriers 1-3, BSC 307 determines the velocities of wireless devices 301-305 (step 600). As illustrated in FIG. 3, wireless devices 301 and 304 are stationary while the V1, V2, and V3 arrows leading from wireless devices 302, 303, and 305 represent the relative magnitude and direction of the velocities of wireless devices 302, 303, and 305. The velocities of wireless devices 301-305 may be determined by receiving Global Positioning System or other sensor information from wireless devices 301-305, by performing BTS triangulation, or by any other method that can determine the velocity of a wireless device.

BSC 307 then determines the average velocity magnitude wireless devices 301-305 (step 602). In this example, the average velocity would be $$\frac{V1 + V2 + V3 + 0 + 0}{5}$$

since wireless devices 301 and 304 are not moving. Also, the average velocity is considered the mobility level for the purposes of this example.

After calculating the average velocity of wireless devices 301-305, BSC 307 compares the average velocity to average velocity threshold values (step 604). FIG. 7 illustrates velocity threshold table 700. Velocity threshold table 700 is a representation of a data structure that BSC 307 may use to compare average velocities to average velocity thresholds. Specifically, velocity threshold table 700 presents a column with average velocity thresholds in miles per hour and a carrier frequency communication mode that corresponds to the average velocity for each of carriers 1-3. It should be understood that the average velocity thresholds shown in table 700 are merely exemplary and can take any value that a network operator might choose.

In this example, BSC 307 determined in step 602 that the average velocity of wireless devices 301-305 is 35 MPH. Therefore, in accordance with velocity threshold table 700, BSC 307 determines that carriers 1 and 2 should be in traffic mode and carrier 3 should be in hand down mode. Accordingly, BSC 307 selects traffic mode for carriers 1-2 and hand down mode for carrier 3 (step 606).

After the communication modes are selected, carriers 1-3 exchange communications using their respective communication modes. BSC 307 assigns each of wireless devices 301-305 to one of the carriers in accordance with the velocity of the device (step 608). In this example, V1 and V2 are above a velocity threshold indicating that wireless devices 302 and 303 should be assigned to a hand down carrier. Accordingly, BSC 307 assigns the two devices to carrier 3. Similarly, the velocities of wireless devices 301, 304, and 305 is below the threshold and those devices are assigned to traffic mode carriers 1 and 2. Each wireless device 301, 304, and 305 may be assigned to carrier 1 or 2 based on the current communication load on each of carriers 1 and 2.

Figure 8:
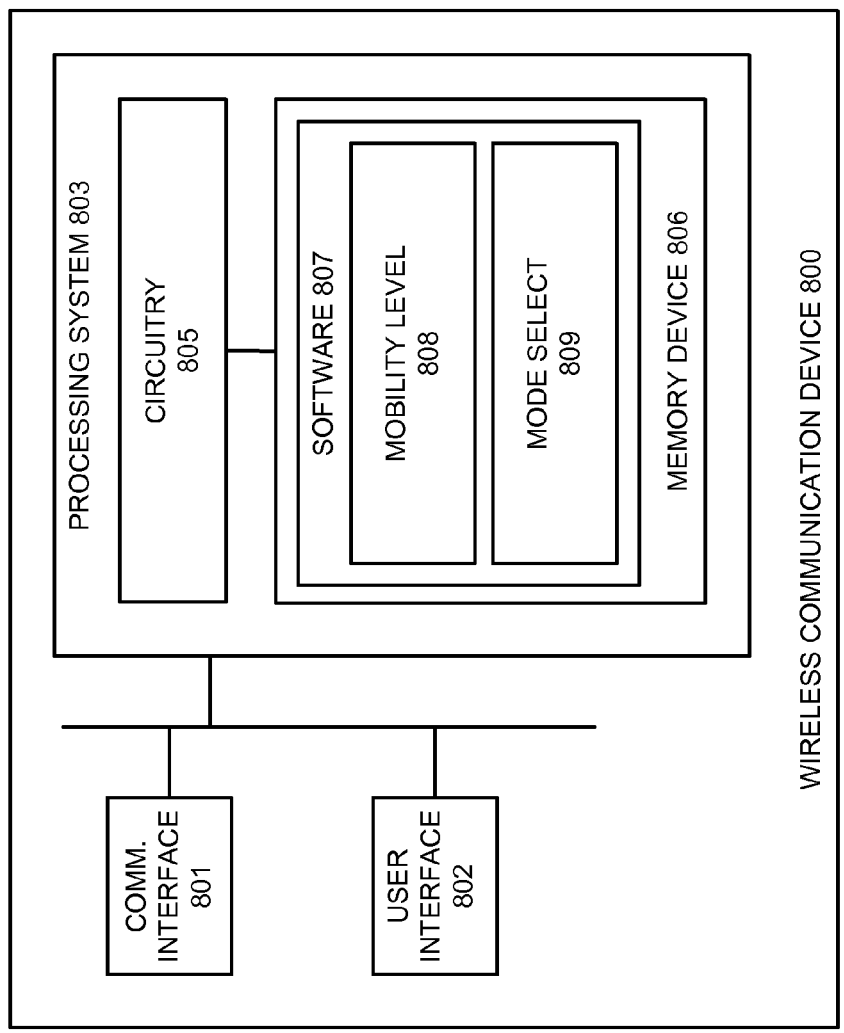
FIG. 8 illustrates a communication control system for selecting a carrier frequency mode based on wireless device mobility.

FIG. 8 illustrates communication control system 800. Communication control system 800 is an example of base station controller 307, although base station controller 307 may use alternative configurations. Additionally, the functionality of communication control system 800 may be located in a system external to base station controller 307. Communication control system 800 comprises communication interface 801, user interface 802, and processing system 803. Processing system 803 is linked to communication interface 801 and user interface 802. Processing system 803 includes processing circuitry 805 and memory device 806 that stores operating software 807.

Communication interface 801 comprises components that communicate over communication links, such as network cards, ports, RF transceivers, processing circuitry and software, or some other communication devices. Communication interface 801 may be configured to communicate over metallic, wireless, or optical links. Communication interface 801 may be configured to use TDM, IP, Ethernet, optical networking, wireless protocols, communication signaling, or some other communication format—including combinations thereof.

User interface 802 comprises components that interact with a user. User interface 802 may include a keyboard, display screen, mouse, touch pad, or some other user input/output apparatus. User interface 802 may be omitted in some examples.

Processing circuitry 805 comprises microprocessor and other circuitry that retrieves and executes operating software 807 from memory device 806. Memory device 806 comprises a non-transitory storage medium, such as a disk drive, flash drive, data storage circuitry, or some other memory apparatus. Operating software 807 comprises computer programs, firmware, or some other form of machine-readable processing instructions. Operating software 807 includes mobility level determination module 808 and mode selection module 809. Operating software 807 may further include an operating system, utilities, drivers, network interfaces, applications, or some other type of software. When executed by circuitry 805, operating software 807 directs processing system 803 to operate communication control system 800 as described herein.

In particular, mobility level determination module 808 directs processing system 803 to determine a mobility level of a plurality of wireless communication devices. Mode selection module 809 directs processing system 803 to select one of a first communication mode or a second communication mode for at least one of a plurality of carrier frequencies based on the mobility level, wherein the first communication mode allows full wireless access functionality and the second communication mode allows less than full wireless access functionality. Mode selection module 809 further directs processing system 803 to instruct a wireless access node to exchange communications on the at least one of the plurality of carrier frequencies using the one of the first communication mode or the second communication mode that is selected.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a wireless communication system, comprising:
   in a wireless access node, providing wireless communication access to a plurality of wireless communication devices over a plurality of carrier frequencies;
   determining a mobility level of the plurality of wireless communication devices;
   selecting one of a first communication mode or a second communication mode for at least one of the plurality of carrier frequencies based on the mobility level, wherein the second communication mode is selected if the mobility level is above a first threshold and the first communication mode is selected if the mobility level is below a second threshold, and wherein the first communication mode allows full wireless access functionality and the second communication mode allows less than full wireless access functionality;
   exchanging communications on the at least one of the plurality of carrier frequencies using the one of the first communication mode or the second communication mode that is selected.

2. The method of claim 1, wherein selecting one of the first communication mode or the second communication mode further comprises:
   if the mobility level is between the first threshold and the second threshold, allowing the communication mode of the at least one of the plurality of carrier frequencies to remain the same.

3. The method of claim 1, wherein the first communication mode comprises a traffic mode and the second communication mode comprises a hand down mode.

4. The method of claim 1, wherein the mobility level comprises a percentage of the plurality of wireless communication devices having an average velocity above a velocity threshold.

5. The method of claim 1, wherein the mobility level comprises a percentage of the plurality of wireless communication devices having a median velocity above a velocity threshold.

6. The method of claim 1, further comprising:
   assigning a wireless communication device of the plurality of wireless communication devices to one of the at least one of the plurality of carrier frequencies based on a velocity of the wireless communication device.

7. The method of claim 6, wherein assigning a wireless communication device of the plurality of wireless communication devices is further based on a distance of the wireless communication device from the access node and an expected time that the wireless communication device will stay in the coverage area of the wireless access node.

8. The method of claim 6, wherein assigning the wireless communication device of the plurality of wireless communication devices is further based on a communication load on the at least one of the plurality of carrier frequencies.

9. A wireless communication system, comprising:
a wireless access node configured to provide wireless communication access to a plurality of wireless communication devices over a plurality of carrier frequencies;
a communication control system configured to determine a mobility level of the plurality of wireless communication devices and select one of a first communication mode or a second communication mode for at least one of the plurality of carrier frequencies based on the mobility level, wherein the second communication mode is selected if the mobility level is above a first threshold and the first communication mode is selected if the mobility level is below a second threshold, and wherein the first communication mode allows full wireless access functionality and the second communication mode allows less than full wireless access functionality; and
the wireless access node further configured to exchange communications on the at least one of the plurality of carrier frequencies using the one of the first communication mode or the second communication mode that is selected.

10. The system of claim 9, wherein the communication control system is configured to select one of the first communication mode or the second communication mode by, if the mobility level is between the first threshold and the second threshold, allowing the communication mode of the at least one of the plurality of carrier frequencies to remain the same.

11. The system of claim 9, wherein the first communication mode comprises a traffic mode and the second communication mode comprises a hand down mode.

12. The system of claim 9, wherein the mobility level comprises a percentage of the plurality of wireless communication devices having an average velocity above a velocity threshold.

13. The system of claim 9, wherein the mobility level comprises a percentage of the plurality of wireless communication devices having a median velocity above a velocity threshold.

14. The system of claim 9, further comprising:
the communication control system configured to assign a wireless communication device of the plurality of wireless communication devices to one of the at least one of the plurality of carrier frequencies based on a velocity of the wireless communication device.

15. The system of claim 14, wherein the communication control system configured to assign a wireless communication device of the plurality of wireless communication devices to one of the at least one of the plurality of carrier frequencies further based on a distance of the wireless communication device from the access node and an expected time that the wireless communication device will stay in the coverage area of the wireless access node.

16. The system of claim 14, wherein the communication control system configured to assign a wireless communication device of the plurality of wireless communication devices to one of the at least one of the plurality of carrier frequencies further based on a communication load on the at least one of the plurality of carrier frequencies.

17. A non-transitory computer readable medium having instructions stored thereon for operating a communication control system, wherein the instructions, when executed by the communication control system, direct the communication control system to:
determine a mobility level of a plurality of wireless communication devices, wherein a wireless access node provides wireless communication access to the plurality of wireless communication devices over a plurality of carrier frequencies;
select one of a first communication mode or a second communication mode for at least one of the plurality of carrier frequencies based on the mobility level, wherein the second communication mode is selected if the mobility level is above a first threshold and the first communication mode is selected if the mobility level is below a second threshold, and wherein the first communication mode allows full wireless access functionality and the second communication mode allows less than full wireless access functionality; and
instruct the wireless access node to exchange communications on the at least one of the plurality of carrier frequencies using the one of the first communication mode or the second communication mode that is selected.

\* \* \* \* \*